United States Patent
Wang et al.

(10) Patent No.: US 11,783,205 B2
(45) Date of Patent: Oct. 10, 2023

(54) MACHINE LEARNING-BASED RULE MINING ALGORITHM

(71) Applicant: SAP SE, Walldorf (DE)

(72) Inventors: Kefeng Wang, Wiesloch (DE); Andreas Seifried, Hügelsheim (DE); Birgitta Bruegel, Limburgerhof (DE); Kieran Turley, Galway (IE); Dimitrij Raev, Mannheim (DE)

(73) Assignee: SAP SE, Walldorf (DE)

( * ) Notice: Subject to any disclaimer, the term of this patent is extended or adjusted under 35 U.S.C. 154(b) by 954 days.

(21) Appl. No.: 16/717,819

(22) Filed: Dec. 17, 2019

(65) Prior Publication Data
US 2021/0182695 A1 Jun. 17, 2021

(51) Int. Cl.
*G06N 5/025* (2023.01)
*G06N 20/00* (2019.01)

(52) U.S. Cl.
CPC ............. *G06N 5/025* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2013/0204657 A1* | 8/2013 | Ghosh | G06Q 30/02 705/7.29 |
| 2014/0207792 A1* | 7/2014 | Carasso | G06F 40/211 707/748 |
| 2015/0160797 A1* | 6/2015 | Shearer | H04L 67/025 715/740 |

OTHER PUBLICATIONS

Džeroski, Sašo. "Relational data mining applications: an overview." Relational data mining (2001): 398 pages. (Year: 2001).*
Li, Jiuyong. "On optimal rule discovery." IEEE Transactions on knowledge and data engineering 18.4 (2006): 460-471. (Year: 2006).*
Manganaris, Stefanos, et al. "A data mining analysis of RTID alarms." Computer Networks 34.4 (2000): 571-577. (Year: 2000).*
Solanki, Surbhi K., and Jalpa T. Patel. "A survey on association rule mining." 2015 fifth international conference on advanced computing & communication technologies. IEEE, 2015. (Year: 2015).*

* cited by examiner

*Primary Examiner* — Vincent Gonzales
(74) *Attorney, Agent, or Firm* — Klarquist Sparkman, LLP

(57) ABSTRACT

Data is received that defines a rule mining run including a scope of a search and at least one data source to be searched. In response, the at least one data source is polled to obtain rules responsive to the rule mining run. Each rule can specify one or more actions to take as part of a computer-implemented process when certain conditions are met. A list of rules (i.e., a proposed subset of the obtained rules) can then be generated using at least one machine learning model. The generated list of rule can then be displayed in a graphical user interface. Related apparatus, systems, techniques and articles are also described.

18 Claims, 4 Drawing Sheets

FIG. 2

MACHINE LEARNING-BASED RULE MINING ALGORITHM

TECHNICAL FIELD

The subject matter described herein relates to techniques for defining rules for computer-implemented processes using machine learning.

BACKGROUND

Computer-implemented processes are becoming increasingly complex to address different workflows. Such processes typically utilize various business rules which define specific actions to be taken when a certain condition or value is met. These business rules can apply to various endeavors including supply chain management, human resources, customer relations, and data management. Many computing architectures utilize rule repositories to house business rules which may be in dedicated databases or be stored along with other data. Given the explosion of enterprise data, the time and costs for generating, updating, and otherwise managing business rules

SUMMARY

In a first aspect, data is received that defines a rule mining run including a scope of a search and at least one data source to be searched. In response, the at least one data source is polled to obtain rules responsive to the rule mining run. Each rule can specify one or more actions to take as part of a computer-implemented process when certain conditions are met. A list of rules (i.e., a proposed subset of the obtained rules) can then be generated using at least one machine learning model. The generated list of rule can then be displayed in a graphical user interface.

The at least one machine learning model can use association rules to identify rules most relevant to the scope of the search. Particularly, the at least one machine learning model can be configured to optimize a user-specified measure of rule value with respect to a set of sample data and user-specified constraints. The at least one machine learning model can take various forms including any association rule mining algorithm (i.e., an ML model for discovering relations between variables in large databases, etc.) such as a K-Optimal Rule Discovery (KORD) algorithm.

The graphical user interface can include graphical user interface elements allowing for the sorting of the list of rules and for accepting or rejecting rules.

The rules can take various forms and be used across different type of processes. As one non-limiting example, the rules are business rules which are used in connection with computer-implemented business processes such as supply chain management, human resources, customer relations, and data management.

In one example, various, accepted rules (e.g., rules accepted via user-generated input in the graphical user interface) can be activated in a rules repository utilized by the computer implemented processes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for more rapid identification and reuse of rules for computer-implemented processes thereby reducing consumption of computing resources (e.g., memory, processor, I/O, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is an example graphical user interface view showing mined rules available to add to a rules repository;

DETAILED DESCRIPTION

The current subject matter is directed to enhanced techniques for defining rules as part of complex computer-implemented process. These rules are sometimes referred to as business rules. In particular, with the current subject matter, machine learning models are used to define or otherwise suggest aspects for rules based on existing data sets. These data sets, for example, can be characterized as master data. Master data represents the business objects that contain the most valuable, agreed upon information shared across an organization. Business object can cover static reference data, transactional, unstructured, analytical, hierarchical and metadata.

Figure 1:
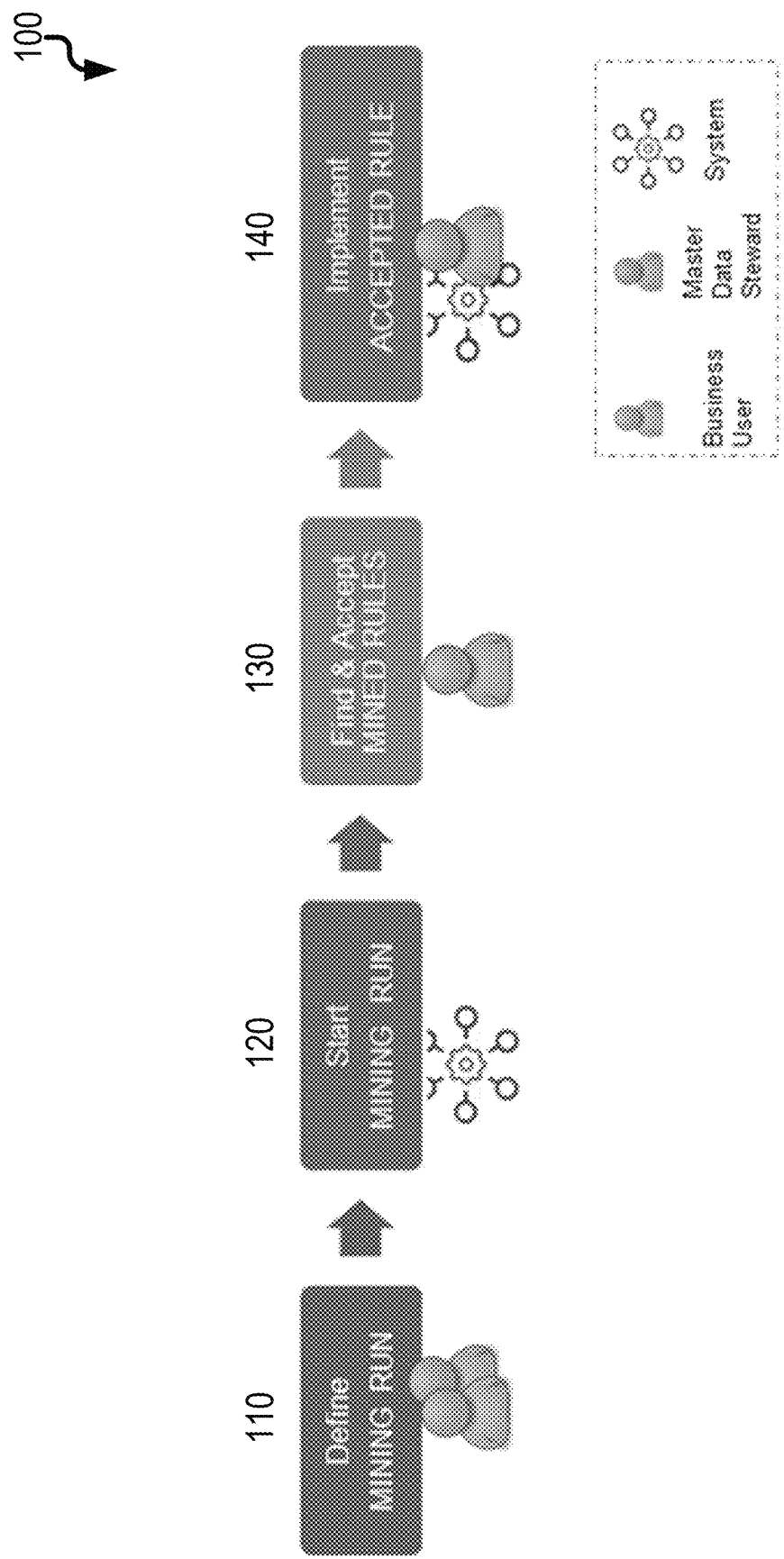
FIG. 1 is a process flow diagram illustrating a workflow for generating and executing a rule mining run.

FIG. 1 is a diagram 100 illustrating aspects of a process to identify rules which will be described in further details below. Initially, at 110, parameters of a mining run are defined. For example, the mining run can be defined to search specific attributes within specific data sources. Once the parameters of the mining run are defined, at 120, the mining run can be initiated. The mining run can, at 130, find rules and make them available to a user to accept or reject within a graphical user interface. The accepted rules can, at 140, later be implemented to control subsequently computer-implemented processes.

With regard to defining the mining run at 110, before rule mining is started, the end user needs to specify the goal of the mining project (e.g. find rules for material requirements planning (MRP) data) including the scope of the mining rune. The mining scope defines the attributes and the data that should be used for mining. With some organizations, a master data steward and a business user together define a mining scope which, in turn, can comprise two parts: Field Scope and Focus Area.

The Field Scope can define the attributes that are used for mining. The values of the selected attributes are examined to find potential rules. For example, if MARA-MTART, MARA-SPART, and MARA-MEINS are in the attribute scope, the system will find valid combinations of values for these attributes. An example of a proposed rule could be: IF MTART=FERT AND SPART=XYZ THEN MEINS=KG.

The Focus Area can define criteria to select data that is used for mining. The focus area will restrict the mining, for example, to products of type FERT and HAWA. These criteria will also be used as a part of the proposed rules. Before selecting the data scope and attribute scope, the end user can select which tables (i.e., the data source to be mined) should be involved in this rule mining run.

In some implementations, the master data mining can be configured to support a subset of pre-defined attributes of certain data types, for example: CHAR, NUM, UNIT. Furthermore, the mining can specifically avoid certain attributes such as CREATED_BY, CHANGED_BY, etc. The end user can select attributes from supported attributes available in the selected tables. Attributes which are not supported or do not contain much information will be filtered out directly. While the algorithm can handle all data types, it may not make sense to mine rules for some numeric values such as 0.12 of amounts or some unique IDs. Rather, the focus can be on categorical fields (i.e. fields with a predefined field list for which different combinations or hierarchies are important in the business processes in which they are used).

An example of a user-defined field scope: Unit of Measure (MARA-MEINS), Product Hierarchy(MARA-PROH), MRP Controller(MARA-DIMS), MRP Profile, Valuation Area etc.

With regard to the data scope, selective fields in selected tables defined in customizing can be used for data selection. Key fields can be configured to always be available for data selection. In the data scope selection, the system, can for example, support only IS operator, and especially wildcard * on Material Number MARTNR. In some variations in order to obtain statistics regarding proposed rules, it can be made mandatory to select a single value on key attributes in case of multiple table selection, see following examples in Table 1 (which shows examples of Mandatory Key fields as Single Value selection).

Example of Data Scope: Material Type=Packaging, Material Group=10010 and 10020 and 10030, and Plant=1000.

TABLE 1

| Example (tables contained attributes scope) | Mandatory Key fields as Single Value selection |
| --- | --- |
| MARA | -- |
| MARC | -- |
| MARA, MARC | WERKS |
| MARA, MARD | WERKS, LGORT |
| MARA, MARC, MARD | WERKS, LGORT |
| MARA, MARC, MVKE | WERKS, VKORG, VTWEG |
| MARA, MARC, MARD, MVKE | WERKS, LGORT, VKORG, VTWEG |
| MARC, MARD, MVKE | WERKS, LGORT, VKORG, VTWEG |

Before a mining run is started, the end user can specify limits on mining parameters such as a maximum number of rules (<=5000).

Once the mining run is defined, a master data steward can start the mining run. Once it is started, the mining run can execute in a background job. The user interface can indicate a current status of a mining run (e.g., running, finished, etc.).

The mining run job can call a machine learning algorithm (e.g., KORD) to scan the data defined by mining scope, and generate list of attributes and value combinations per the specified mining parameters.

If more than 5000 rules are generated, then the mining run process can cease. As KORD considers simpler associations before more complex associations, such a model can be configured to stop when there a predefined number of attributes are present (e.g., max attribute=4).

The system can be configured to allow an end user to interrupt/stop the mining run when she or he thinks it is running too long or anything is wrongly defined. The end user can then change the scope or other parameters and restart the mining run. When mining run is still running or finished, changes to the mining run are not permitted.

After mining run is finished in the background, the mining results can be stored in a database to allow a user to later review the mining run result and find rules which are meaningful to the associated processes. FIG. 2 is a diagram 200 including a graphical user interface view which includes a list of mined rules. Each mined rule can include attributes with values as a condition and an attribute with a value as a check. The scope of the corresponding mining run can also be displayed.

Each mined rule should be displayed in the pattern: IF . . . AND . . . THEN . . . , with description of attribute and value, and technical expression, for example:

If Base Unit of Measure=Days
And Material Type='Service'
Then MRP Type=Time-phased Planning
(IF MARA-MEINS=DAY AND MARA-MTART='DIEN' THEN MARC-DISMM='R1')

While the same rule can be obtained from different mining runs (having a same scope), duplicative rules are only displayed once. Each mined rule can be identified by a unique combination of Field-Value of Condition, Checked Field and Scope.

If any of the Condition, Checked Fields or Scope are different, then they are different mined rules. Below are three examples rule considered as different mined rules.

If Product Type=FERT, Then MRP Type=T1, Scope: Plant=1000 and MRP Group=DPB
If MRP Group=DPB, Then MRP Type=T1, Scope: Plant=1000 and Product Type=FERT
If MRP Group=DPB, Then MRP Type=T1, Scope: Plant= (1000 or 2000) and Product Type=FERT Each mined rule can also include information to help a user make a decision of whether or not to implement the rule: (i) Numbers/percentage of data from the mining scope that match this rule; (ii) Numbers/percentage of data from the mining scope that violate this rule; and (iii) Numbers/percentage of data from the mining scope that are not relevant to this rule. Such information can be calculated from the statistical result of the KORD algorithms and can include information such as Support, Confidence, Leverage or Lift which characterize and quantify each rule. Each mined rule can be represented by a unique hash of the selected fields in scope and condition which, in turn, can be used to identify this rule in a subsequent mining run. In some cases, the statistics associated with a rule can differ due to changes in the underlying data (e.g., a business process may change causing the statistics for the rule to change). In such cases, the statistics of a rule can be supplemented with other information that provide the user with insight into what changes were made to the corresponding master data.

Information can also be displayed which indicates a date when the rules were last evaluated. A user can also access the product list behind these numbers/percentage from the user interface to aid in making the decision. The resulting rule list can be large depending on the selected mining scope and the specified maximum number of rules. The graphical user interface can be configured to readily enable a user to find optimal mining rules.

The rule list can include various graphical user interface elements to allow for easy sorting and filtering. For example, the interface allows for filtering by check attributes, condition attributes, and scope attributes. On the list, graphical user interface elements can also be provided to allow for filtering by status, e.g. Accepted, Rejected, New rules. Further, the rules can be grouped by check attributes and/or otherwise intelligently grouped (for example, using a K-Medoids algorithm).

To make the decision more transparent, and communication more efficient, the graphical user interface can be configured to allow for end user comments on the mined rules. Also, the comments can specify what needs to be true if the rule can be accepted, e.g. apply it to all plants if the rule has scope for only one plant.

The user interface can also be provided to allow for the rejection of displayed mining rules. Such an arrangement is important in that many discovered rules shave no real business impact and, as such, these rules can be automatically rejected rather than being displayed again to a user. When a rule is rejected and the rule is identified again during a subsequent mining run, such a rule can also be illustrated as having been rejected. Conversely, when the user finds interesting rules, he/she can mark the mined rule as accepted. Therefore, there may be an accept option for each mined rule, and a comments/note function to the ender user to annotate conditions required to accept this rule.

There can be four status categories for mined rules: Initial, To be Reviewed, Accepted, Rejected. The rules can be freely set to any of these four statuses except for those rules that have already been linked/deployed (i.e., added to a rules repository).

Before mined rules are added into a rule repository, to avoid creation of duplicated rules from mined rules, the display can be configured to identify similar rules (by checked field). By providing this information, the end user can check these similar rules to decide whether to add a proposed rule as a new rule or to merge/link the proposed rule with an existing rule in the rule repository. After comparing the rules in the repository, the end user can decide whether the accepted mined rule is: (i) completely new, (ii) already part of an existing rule, (iii) similar to an existing rule, or (iv) suitable for merging with an existing rule.

A mined rule can be linked to a data quality rule. The linked data quality rule can be displayed as a column in the table of the mined rules which can be grouped, sorted, or filtered. Multiple mined rules can be linked to the same data quality rule. The checked field can be displayed as a column in the table of the mined rules which can also be grouped, sorted or filtered.

The graphical user interface can allow the user to select one or more mined rules with the same checked field to link them to a particular data quality rule. Information can be displayed in the graphical user interface that shows data quality rules with the same checked field (e.g., the field is already defaulted with the data quality rule, etc.). Various view can be provided to also allow for the creation of new data quality rules and the linkage of same to mined rules.

Once mined rules are linked to a data quality rule, the system can be configured to allow an end user to remove the link again which can only be removed from the data quality rule. There can be multiple mined rules linked to one data quality rule, therefore it should be possible to remove an individually mined rule.

After rule is added into the rule repository, the data quality rule ID can be returned and illustrated in the mining result. In addition, there can be a link on the ID so that the end user can easily navigate to the data quality rule in the user interface to supplement it with additional information and/or to active such data quality rule.

The end user can create multiple mining runs for different purposes. These mining runs can be displayed in a list in a graphical user interface and elements can be provide to allow the end user to trigger or delete such mining runs. Elements can also be provided which allow the end user to modify a mining run.

After a mining run result is generated and approved by an end user and by a master data steward, the user interface can provide transparency on the mining run level. For example, information can be displayed which characterizes what has been completed and what is required to finalize the mining run. Therefore, the interface can show an overview of mined rules on each mining run, one example could be:

Open: 55
Accepted: 5
To be Reviewed: 2

To maximize the efficiency of rule mining, minimize end user effort and provide transparency, the system can manage the mining result and decisions on mined rules with following objectives: (a) the mined rule and its status Accept, Rejected are valid cross all mining runs; and (b) Accepted/Rejected Rules from previous mining runs can be reused by later mining runs.

Various types of machine learning models can be used to identify appropriate rules. As one example, an association-based model is used. In a specific example, a K-Optimal Rule Discovery (KORD) algorithm can be used. KORD follows the idea of generating association rules with respect to a well-defined measure, instead of first finding all frequent item sets and then generating all possible rules. The algorithm only calculates the top-k rules according to that measure. The size of the right hand side (RHS) of those rules can be restricted to one. Furthermore, the KORD implementation generates only non-redundant rules.

KORD, as provided herein, can work with the following set of parameters: transaction table, parameter table, and output table.

Transaction Table. The data basis for the analytical algorithm needs to be prepared as a so called transaction table. Each line in the database (e.g. database table MARA) can be split up into a transaction (=line of the database) with their item (=column+value of the database). Table 1A shows an example for table MARA.

TABLE 1A

| Transaction ID | Items |
|---|---|
| 1 | MATKL=01 |
| 1 | MTART=FERT |
| 1 | MBRSH=M |
| 1 | MEINS=KG |
| 1 | ... |
| 2 | MATKL=01 |
| 2 | MTART=HALB |
| 2 | MEINS=L |

TABLE 1A-continued

| Transaction ID | Items |
|---|---|
| 2 | ... |
| 3 | MATKL=01 |
| 3 | MTART=FERT |
| 3 | MBRSH=C |
| 3 | ... |
| 4 | MATKL=02 |
| 4 | MTART=FERT |
| 4 | MEINS=L |
| 4 | ... |

Parameter Table. The parameters given in tables 2 and 3 can control the execution runtime of KORD and involve various factors such as a number of rules, a maximum length of antecedent (i.e., number of fields in the IF-Statement of the rule), a sort order of the rules, a threshold definition for statistical measures, and the like.

TABLE 2

| Name | Data Type | Default Value | Description | Dependency |
|---|---|---|---|---|
| TOPK | Integer | 10 | Specifies the number (k) of top rules. | |
| MAX_ANTECENDENT | Integer | 40 | Specifies the maximum length of antecedent rules. | |
| MEASURE_TYPE | Integer | 0 | Specifies the measure that will be used to define the priority of the rules.<br>  0: Leverage<br>  1: Lift | |

TABLE 3

| Name | Data Type | Default Value | Description | Dependency |
|---|---|---|---|---|
| IS_USE_EPSILON | Integer | 0 | Controls whether to use epsilon to punish the length of rules:<br>  0: Does not use epsilon<br>  Others: Uses epsilon | |
| THREAD_NUMBER | Integer | 1 | Specifies the number of threads. | |
| MIN_SUPPORT | Double | 0.0 | Specifies the minimum support. | |
| MIN_CONFIDENCE | Double | 0.0 | Specifies the minimum confidence. | |
| MIN_COVERAGE | Double | The value of MIN_SUPPORT | Specifies the minimum coverage. Default: T | |
| MIN_MEASURE | Double | 0.0 | Specifies the minimum measure value for leverage or lift, dependent on the MEASURE_TYPE setting. | |
| EPSILON | Double | 0.0 | Epsilon value. | Only valid when IS_USE_EPSILON is not 0. |

Output Table. An output table as in Table 4 can returns the rules with statistical information including the rule expression separated in antecedent (=IF-Statement) and consequent (=Then-Statement). The output table can include information about various tables including Rules (Table 5), Antecedent (Table 6), and Consequent (Table 7).

TABLE 4

| Table | Column | Column Data Type | Description |
|---|---|---|---|
| Rules | 1st column | Integer | ID |
| | 2nd column | Double | Support |
| | 3rd column | Double | Confidence |
| | 4th column | Double | Lift |
| | 5th column | Double | Leverage |
| | 6th column | Double | Measure value |
| Antecedent | 1st column | Integer | ID |
| | 2nd column | Varchar or nvarchar | Antecedent items |
| Consequent | $1^{st}$ column | Integer | ID |
| | $2^{nd}$ column | Varchar or nvarchar | Consequent items |

Example

Rules:

TABLE 5

| RULE_ID | SUPPORT | CONFIDENCE | LIFT | LEVERAGE | MEASURE |
|---|---|---|---|---|---|
| 1 | 0 | 0.25 | 0.5 | 2 | 0.125 | 2 |
| 2 | 1 | 0.25 | 1 | 4 | 0.1875 | 4 |
| 3 | 2 | 0.25 | 0.5 | 2 | 0.125 | 2 |
| 4 | 3 | 0.25 | 1 | 4 | 0.1875 | 4 |
| 5 | 4 | 0.25 | 0.5 | 2 | 0.125 | 2 |
| 6 | 5 | 0.25 | 1 | 4 | 0.1875 | 4 |
| 7 | 6 | 0.25 | 1 | 2 | 0.125 | 2 |
| 8 | 7 | 0.25 | 0.5 | 2 | 0.125 | 2 |
| 9 | 8 | 0.25 | 0.5 | 2 | 0.125 | 2 |
| 10 | 9 | 0.25 | 1 | 4 | 0.1875 | 4 |

Antecedent:

TABLE 6

| RULE_ID | ANTECEDENT_RULE |
| --- | --- |
| 1 | 0 | MATKL = 01 |
| 2 | 0 | MTART = FERT |
| 3 | 1 | MEINS = KG |
| 4 | 2 | MATKL = 01 |
| 5 | 2 | MTART = FERT |
| 6 | 3 | MBRSH = M |
| 7 | 4 | MEINS = L |
| 8 | 5 | MATKL = 01 |
| 9 | 5 | MEINS = L |
| 10 | 6 | MTART = HALB |
| 11 | 7 | MATKL = 01 |
| 12 | 7 | MTART = FERT |
| 13 | 8 | MEINS = L |
| 14 | 9 | MTART = FERT |
| 15 | 9 | MEINS = L |

Consequent:

TABLE 7

| RULE_ID | CONSEQUENT_RULE |
| --- | --- |
| 1 | 0 | MBRSH = M |
| 2 | 1 | MBRSH = M |
| 3 | 2 | MEINS = KG |
| 4 | 3 | MEINS = KG |
| 5 | 4 | MTART = HALB |
| 6 | 5 | MTART = HALB |
| 7 | 6 | MEINS = L |
| 8 | 7 | MBRSH = C |
| 9 | 8 | MATKL = 02 |
| 10 | 9 | MATKL = 02 |

KORD follows the idea of generating top-k association rules with respect to a well-defined measure (Lift or Leverage), instead of first finding all frequent item sets and then generating all possible rules. Furthermore, the KORD implementation generates only non-redundant rules.

The algorithm's search strategy can be based on the so-called OPUS search. OPUS is an efficient technique that functions recursively with respect to the parameters in the left hand search (LHS) and the right hand search (RHS).

KORD does not build a real tree search structure; instead it traverses the LHSs in a specific order, which allows the pruning of the search space by simply not visiting those item sets subsequently. In this way, pruning rules can be used which restrict the possible LHSs and RHSs at different rule generation stages.

The OPUS search is presented as a recursive procedure with three arguments: (1) CurrentLHS: the set of conditions in the antecedent of the rule currently being considered, (2) AvailableLHS: the set of conditions that may be added to the antecedent of rules to be explored below this point; and (3) AvailableRHS: the set of conditions that may appear on the consequent of a rule in the search space at this point and below.

Figure 3:
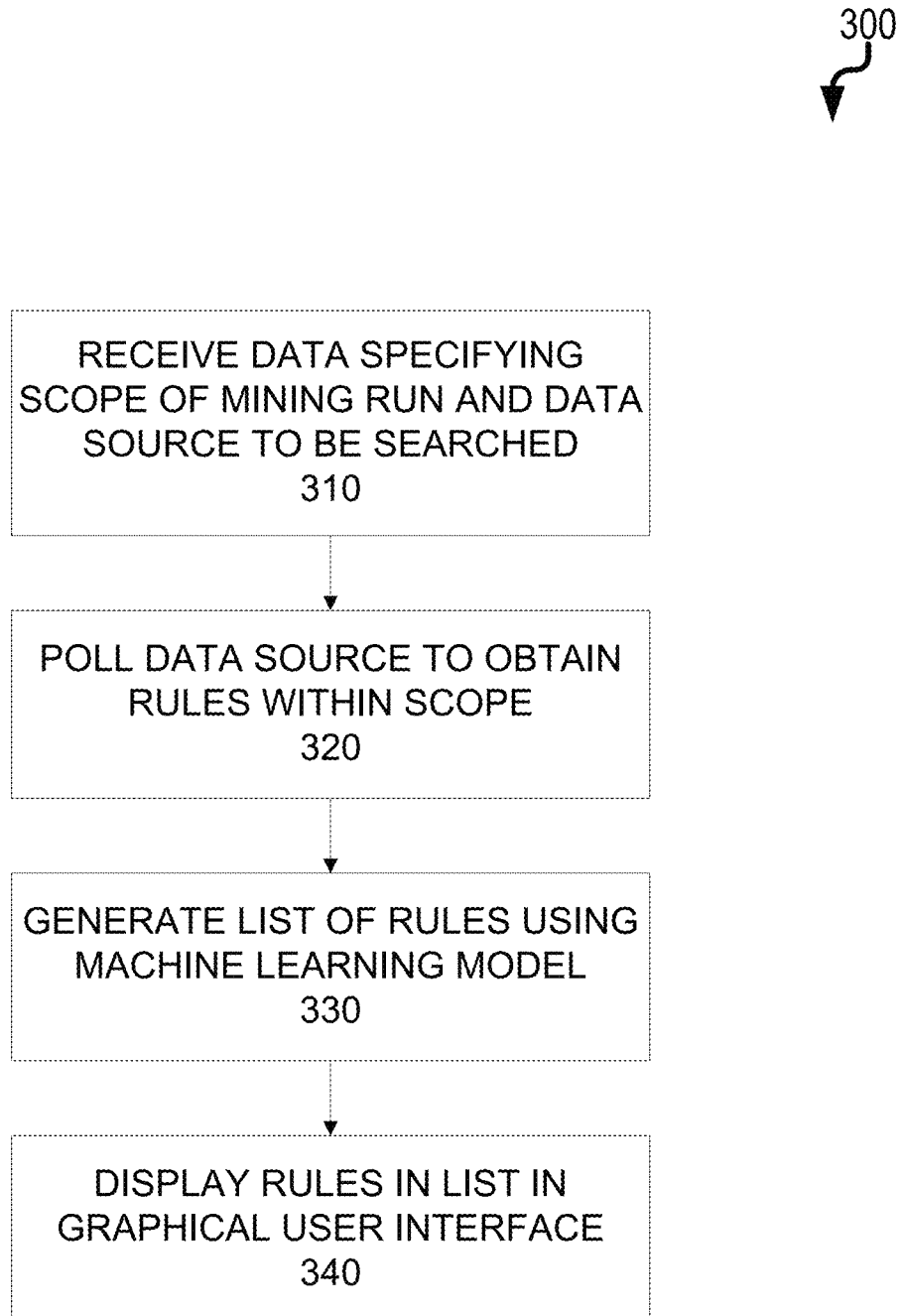
FIG. 3 is a process flow diagram illustrating a machine learning-based rule mining algorithm.

With reference to diagram 300 of FIG. 3, initially, at 310, data is received that defines a rule mining run including a scope of a search and at least one data of a data source to be searched. Subsequently, at 320, the data source is polled to obtain rules responsive to the rule mining run. The rules can each specify one or more actions to take as part of a computer-implemented process when certain conditions are met. Next, at 330, a list of rules from the obtained rules is generated using at least one machine learning model, a list of rules from the obtained rules. Next, at 340, the generated list of rules is caused to be displayed in a graphical user interface.

Figure 4:
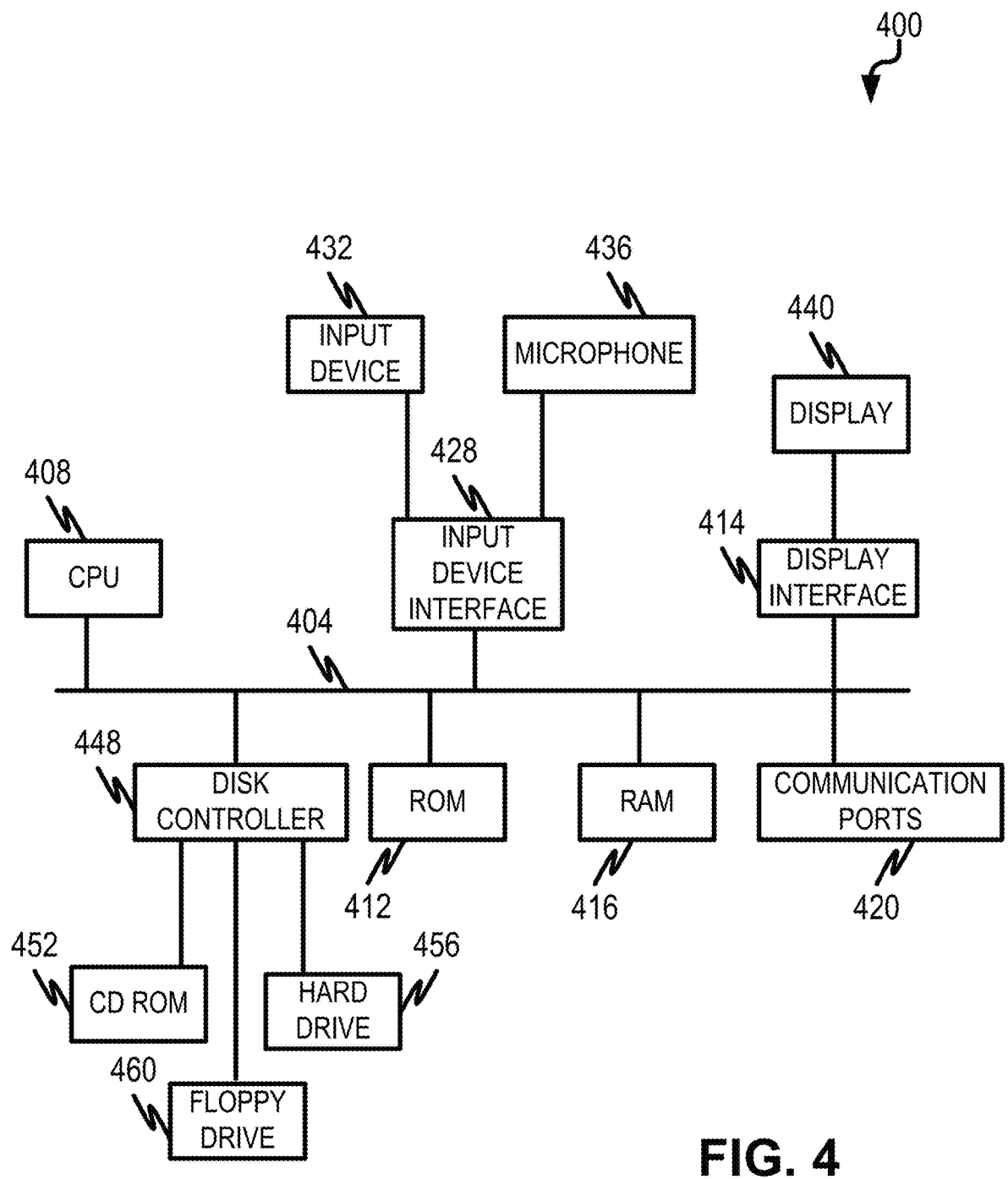
FIG. 4 is a diagram of a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising;
   receiving data defining a rule mining run including a mining scope and at least one data source to be mined;
   polling the at least one data source to obtain rules responsive to the rule mining run, the rules each specifying one or more actions to take as part of a computer-implemented process when certain conditions are met;
   generating, using at least one machine learning model comprising a K-Optimal Rule Discovery (KORD) algorithm, a list of rules from the obtained rules and information to help make a decision of whether or not to implement a given rule out of the list of rules, wherein the information comprises how much data from the mining scope matches the given rule, how much data from the mining scope violates the given rule, and how much data of the mining scope is not relevant to the given rule; and
   causing the generated list of rules to be displayed in a graphical user interface, wherein the graphical user interface indicates how much data from the mining scope matches the given rule, how much data from the mining scope violates the given rule, and how much data of the mining scope is not relevant to the given rule.

2. The method of claim 1, wherein the at least one machine learning model uses association rules to identify rules most relevant to the mining scope.

3. The method of claim 1, wherein the at least one machine learning model optimizes a user-specified measure of rule value with respect to a set of sample data and user-specified constraints.

4. The method of claim 3, wherein the K-Optimal Rule Discovery (KORD) algorithm calculates support, confidence, leverage, or lift.

5. The method of claim 1, wherein the graphical user interface comprises graphical user interface elements allowing for sorting of the list of rules and for accepting or rejecting rules.

6. The method of claim 5, wherein the rules are business rules and the computer-implemented process is a computer-implemented business process.

7. The method of claim 5 further comprising:
   activating rules via the graphical user interface in a rules repository utilized by the computer-implemented processes.

8. A system comprising;
   at least one data processor; and
   memory including instructions which, when executed by the at least one data processor, result in operations comprising:
   receiving data defining a rule mining run including a mining scope and at least one data source to be mined;
   polling the at least one data source to obtain rules responsive to the rule mining run, the rules each specifying one or more actions to take as part of a computer-implemented process when certain conditions are met;
   generating, using at least one machine learning model comprising a K-Optimal Rule Discovery (KORD) algorithm, a list of rules from the obtained rules and information to help make a decision of whether or not to implement a given rule out of the list of rules, wherein the information comprises how much data from the mining scope matches the given rule, how much data from the mining scope violates the given rule, and how much data of the mining scope is not relevant to the given rule; and causing the generated list of rules to be displayed in a graphical user interface, wherein the graphical user interface comprises a plurality of graphical user interface elements that visually indicate what percentage of data from the mining scope matches the given rule, what percentage of data from the mining scope violates the given rule, and what percentage of data of the mining scope is not relevant to the given rule.

9. The system of claim 8, wherein the at least one machine learning model uses association rules to identify rules most relevant to the mining scope.

10. The system of claim 8, wherein the at least one machine learning model optimizes a user-specified measure of rule value with respect to a set of sample data and user-specified constraints.

11. The system of claim 8, wherein the graphical user interface comprises graphical user interface elements allowing for sorting of the list of rules and for accepting or rejecting rules.

12. The system of claim 11, wherein the rules are business rules and the computer-implemented process is a computer-implemented business process.

13. The system of claim 11, wherein the operations further comprise:

activating rules via the graphical user interface in a rules repository utilized by the computer-implemented processes.

14. A non-transitory computer program product including instructions which, when executed by at least one computing device, result in operations comprising:

receiving data defining a rule mining run including a mining scope and at least one data source to be mined;

polling the at least one data source to obtain rules responsive to the rule mining run, the rules each specifying one or more actions to take as part of a computer-implemented process when certain conditions are met;

generating, using at least one machine learning model comprising a K-Optimal Rule Discovery (KORD) algorithm, a list of rules forming a subset of the obtained rules and information to help make a decision of whether or not to implement a given rule out of the list of rules, wherein the information comprises how much data from the mining scope matches the given rule, how much data from the mining scope violates the given rule, and how much data of the mining scope is not relevant to the given rule; and causing the generated list of rules to be displayed in a graphical user interface, wherein the graphical user interface comprises a plurality of graphical user interface elements that visually indicate what percentage of data from the mining scope matches the given rule, what percentage of data from the mining scope violates the given rule, and what percentage of data of the mining scope is not relevant to the given rule.

15. The computer program product of claim 14, wherein the at least one machine learning model optimizes a user-specified measure of rule value with respect to a set of sample data and user-specified constraints.

16. The computer program product of claim 14, wherein the graphical user interface comprises graphical user interface elements allowing for sorting of the list of rules and for accepting or rejecting rules.

17. The computer program product of claim 16, wherein the rules are business rules and the computer-implemented process is a computer-implemented business process.

18. The computer program product of claim 17, wherein the operations further comprise:

activating rules via the graphical user interface in a rules repository utilized by the computer-implemented processes.

* * * * *